United States Patent
He et al.

(10) Patent No.: US 9,363,505 B2
(45) Date of Patent: Jun. 7, 2016

(54) PIXEL ARRANGEMENT METHOD THAT REDUCES COLOR SHIFT OF PATTERN RETARDER GLASSES BASED 3D DISPLAY SYSTEM IN LARGE VIEW ANGLE AND DISPLAY PANEL USING SAME

(71) Applicant: Shenzhen China Star Optoelectronics Technology Co., Ltd., Shenzhen, Guangdong (CN)

(72) Inventors: Jhenwei He, Shenzhen (CN); Yuyeh Chen, Shenzhen (CN); Liwei Chu, Shenzhen (CN); Chihhao Wu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 404 days.

(21) Appl. No.: 13/821,567

(22) PCT Filed: Feb. 6, 2013

(86) PCT No.: PCT/CN2013/071469
§ 371 (c)(1),
(2) Date: Mar. 8, 2013

(87) PCT Pub. No.: WO2014/117414
PCT Pub. Date: Aug. 7, 2014

(65) Prior Publication Data
US 2014/0210959 A1     Jul. 31, 2014

(51) Int. Cl.
*H04N 13/00* (2006.01)
*H04N 13/04* (2006.01)

(52) U.S. Cl.
CPC ....... *H04N 13/0422* (2013.01); *H04N 13/0434* (2013.01); *H04N 13/0454* (2013.01)

(58) Field of Classification Search
CPC .......... H04N 13/0422; H04N 13/0434; H04N 13/0454
USPC ......................................................... 348/51
See application file for complete search history.

(56) References Cited

U.S. PATENT DOCUMENTS

2007/0258028 A1 * 11/2007 Hong ............................ 349/114
2008/0278574 A1 * 11/2008 Ramstad ........................ 348/51

(Continued)

FOREIGN PATENT DOCUMENTS

| CN | 202275243 U | 6/2012 |
| CN | 102572478 A | 7/2012 |

(Continued)

*Primary Examiner* — Jeffery Williams
(74) *Attorney, Agent, or Firm* — Andrew C. Cheng

(57) ABSTRACT

The present invention provides a pixel arrangement method that reduces color shift of pattern retarder glasses based 3D display system and includes: providing a display panel, which includes a substrate and a plurality of primary pixels that is formed on the substrate in an array; dividing the primary pixels in 3D mode displaying in such a way that each of the primary pixels is divided into four sub-pixels, wherein the sub-pixels are of colors that are pure colors and two adjacent ones of the sub-pixels in either horizontal or vertical direction are of different colors; and dividing the primary pixels in 2D mode displaying in such a way that each of the primary pixels is divided into three or four sub-pixels, wherein the sub-pixels are of colors that are pure colors and two adjacent ones of the sub-pixels in either horizontal or vertical direction are of different colors.

11 Claims, 4 Drawing Sheets

(56) References Cited

U.S. PATENT DOCUMENTS

2009/0290043 A1\* 11/2009 Liu .................... H04N 9/07
 348/223.1
2012/0275183 A1\* 11/2012 Minami .................... 362/602

FOREIGN PATENT DOCUMENTS

| CN | 102902071 A | 1/2013 |
| CN | 203084371 U | 7/2013 |
| JP | 2005110022 A | 4/2005 |

\* cited by examiner

PIXEL ARRANGEMENT METHOD THAT REDUCES COLOR SHIFT OF PATTERN RETARDER GLASSES BASED 3D DISPLAY SYSTEM IN LARGE VIEW ANGLE AND DISPLAY PANEL USING SAME

BACKGROUND OF THE INVENTION

1. Field of the Invention

The present invention relates to the field of liquid crystal display, and in particular to a pixel arrangement method that reduces color shift of pattern retarder glasses based 3D display system in large view angle and a display panel using the method.

2. The Related Arts

Three-dimensional (3D) display techniques can be classified in two types, namely glasses based techniques and bare eye based techniques. Bare eye 3D techniques are generally used in business applications and may be further used in conveniently-carried devices, such as mobile phone in the future. For household applications, such as displays, projectors, and televisions, mostly, 3D glasses are used in order to view 3D images.

Three-dimensional television is an abbreviation for three-dimensional stereoscopic television. When a person views an object in a natural condition, stereopsis is achieved through combining different images perceived by left and right eyes to form a single image. The 3D television adopts the same principle of the slight difference of angles with which two eyes view an object to allow a person to identify the dept of illusion of the object thereby providing the visual perception of stereopsis. Based on the principle, the images that are perceived by the left and right eyes are separated so that a user may obtain the perception of stereopsis with bare eyes and requiring no 3D glasses.

In the current time when high definition televisions are the main stream of the market, 3D mode is an essential function of a large-sized television. Thus, in market competition, simply providing a product with the 3D effect is just not enough to win the market and it is also necessary to enhance the overall quality of 3D image displayed on the large-sized television.

The conventionally used pattern retarder glasses based 3D display system is generally a high brightness 3D display system, which provides 3D images having brightness superior to the shutter glasses based systems and the 3D images so provided are displayed in a non-flicking manner so that human eyes get no tired even for long term watching.

However, as shown in FIG. 1, a conventional pattern retarder glasses based 3D display system is constructed by designating the odd-numbered rows of a display panel as left (right) eye image, while the even-numbered rows are for image of the other eye. Patterns retarders having mutually orthogonal polarizations are alternately arranged and set on pixels that oppose human eyes. Referring to FIG. 2, due to the restrains of such an arrangement, in a large view angle, light that is designated for an image of a specific eye may be observed by a viewer through an incorrect pattern retarder so as to induce the so-called cross-talking. Further, pixels at the borders are all set with the pixels of the same color, so that the image may be easily shifted toward red color when viewed at an upward viewing angle and may be easily shifted toward blue color when viewed at a downward viewing angle and vice versa. This leads to deterioration of quality of display and severely affects market competition power of product.

SUMMARY OF THE INVENTION

An object of the present invention is to provide a pixel arrangement method that reduces color shift of pattern retarder glasses based 3D display system in large view angle in order to well overcome the red/blue color shift issue of the pattern retarder glasses based 3D display system occurring at upward and downward viewing angles to thereby improve the quality of displaying and enhance market competition power of product.

Another object of the present invention is to provide a display panel that well overcomes the red/blue color shift issue of the pattern retarder glasses based 3D display system occurring at upward and downward viewing angles to thereby improve the quality of displaying and enhance market competition power of product.

To achieve the objects, the present invention provides a pixel arrangement method that reduces color shift of pattern retarder glasses based 3D display system in large view angle, comprising the following steps:

(1) providing a display panel, wherein the display panel comprises a substrate and a plurality of primary pixels that is formed on the substrate in an array;

(2) dividing the primary pixels in 3D mode displaying in such a way that each of the primary pixels is divided into four sub-pixels, wherein the sub-pixels are of colors that are pure colors and two adjacent ones of the sub-pixels in either horizontal or vertical direction are of different colors; and (3) dividing the primary pixels in 2D mode displaying in such a way that each of the primary pixels is divided into three or four sub-pixels, wherein the sub-pixels are of colors that are pure colors and two adjacent ones of the sub-pixels in either horizontal or vertical direction are of different colors.

The display panel further comprises a driver circuit formed on the substrate. The driver circuit comprises a color correction algorithm circuit, which functions to drive the sub-pixels in order to regulate color homogeneity of left and right eyes.

In step (2), the four sub-pixels of each of the primary pixels are arranged in a check pattern. The four sub-pixels are of colors that include red, green, and blue. The four sub-pixels of each of the primary pixels are of colors that are cyclically composed of red, green, and blue in ratios of 2:1:1, 1:2:1, and 1:1:2 or the four sub-pixels are of colors that include red, green, blue, and white.

In step (3), when the primary pixels are each divided into four sub-pixels, the four sub-pixels of each of the primary pixels are arranged in a check pattern. The four sub-pixels are of colors that include red, green, blue, and white.

In step (3), when the primary pixels are each divided into three sub-pixels, the three sub-pixels are arranged vertically. The three sub-pixels are of colors that include red, green, and blue.

The present invention also provides a pixel arrangement method that reduces color shift of pattern retarder glasses based 3D display system in large view angle, comprising the following steps:

(1) providing a display panel, wherein the display panel comprises a substrate and a plurality of primary pixels that is formed on the substrate in an array;

(2) dividing the primary pixels in 3D mode displaying in such a way that each of the primary pixels is divided into four sub-pixels, wherein the sub-pixels are of colors that are pure colors and two adjacent ones of the sub-pixels in either horizontal or vertical direction are of different colors; and (3) dividing the primary pixels in 2D mode displaying in such a way that each of the primary pixels is divided into three or four sub-pixels, wherein the sub-pixels are of colors that are pure colors and two adjacent ones of the sub-pixels in either horizontal or vertical direction are of different colors;

wherein the display panel further comprises a driver circuit formed on the substrate, the driver circuit comprising a color correction algorithm circuit, which functions to drive the sub-pixels in order to regulate color homogeneity of left and right eyes;

wherein in step (2), the four sub-pixels of each of the primary pixels are arranged in a check pattern, the four sub-pixels being of colors that include red, green, and blue, the four sub-pixels of each of the primary pixels being of colors that are cyclically composed of red, green, and blue in ratios of 2:1:1, 1:2:1, and 1:1:2 or the four sub-pixels being of colors that include red, green, blue, and white; and wherein in step (3), when the primary pixels are each divided into four sub-pixels, the four sub-pixels of each of the primary pixels are arranged in a check pattern, the four sub-pixels being of colors that include red, green, blue, and white.

The present invention further provides a display panel. The display panel includes 2D and 3D displaying modes and comprises: a substrate and a plurality of primary pixels that is formed on the substrate in an array, wherein in 3D mode displaying, each of the primary pixels comprises four sub-pixels, the sub-pixels being of colors that are pure colors, two adjacent ones of the sub-pixels in either horizontal or vertical direction being of different colors, and in 2D mode displaying, each of the primary pixels comprises three or four sub-pixels, the sub-pixels being of colors that are pure colors, two adjacent ones of the sub-pixels in either horizontal or vertical direction being of different colors.

The display panel further comprises a driver circuit formed on the substrate. The driver circuit comprises a color correction algorithm circuit, which functions to drive the sub-pixels in order to regulate color homogeneity of left and right eyes.

In 3D mode displaying, the four sub-pixels are arranged in a check pattern. The four sub-pixels are of colors that include red, green, and blue. The four sub-pixels of each of the primary pixels are of colors that are cyclically composed of red, green, and blue in ratios of 2:1:1, 1:2:1, and 1:1:2 or the four sub-pixels are of colors that include red, green, blue, and white.

In 2D mode displaying, when each of the primary pixels comprises four sub-pixels, the four sub-pixels are arranged in a check pattern. The four sub-pixels are of colors that include red, green, blue, and white.

In 2D mode displaying, when each of the primary pixels comprises three sub-pixels, the three sub-pixels are arranged vertically. The three sub-pixels are of colors that include red, green, and blue.

The efficacy of the present invention is that the present invention provides a pixel arrangement method that reduces color shift of pattern retarder glasses based 3D display system in large view angle, which when applied to arrange the structure of primary pixels in vertical direction in a pattern retarder glasses based 3D display system, in the 3D mode, arranges each of the primary pixels into a combination of four sub-pixels and in the 2D mode, arranges each of the primary pixels into a combination of three or four pixels and two adjacent ones of the sub-pixels in either horizontal or vertical direction are set to be of different colors so as to eliminate the problem that the interface of the left-eye/right-eye pattern retarders comprises a regular arrangement of pixels of the same color and well overcome the color shift problems of the pattern retarder glasses based 3D display system in upward and downward viewing angles. A color correction algorithm circuit is also included to drive the sub-pixels in order to regulate color homogeneity of left and right eyes and interface of left-eye/right-eye pattern retarders thereby improving quality of displaying and enhancing market competition power of product. The present invention also provides a display panel that well overcomes the red/blue color shift issue of the pattern retarder glasses based 3D display system occurring at upward and downward viewing angles to thereby improve the quality of displaying and enhance market competition power of product.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Referring to FIGS. 3-7, the present invention provides a pixel arrangement method that reduces color shift of pattern retarder glasses based 3D display system in large view angle, comprising the following steps:

Step 100: providing a display panel, wherein the display panel comprises a substrate and a plurality of primary pixels that is formed on the substrate in an array.

Step 200: dividing the primary pixels in 3D mode displaying in such a way that each of the primary pixels is divided into four sub-pixels, wherein the sub-pixels are of colors that are pure colors and two adjacent ones of the sub-pixels in either horizontal or vertical direction are of different colors.

Figure 1:
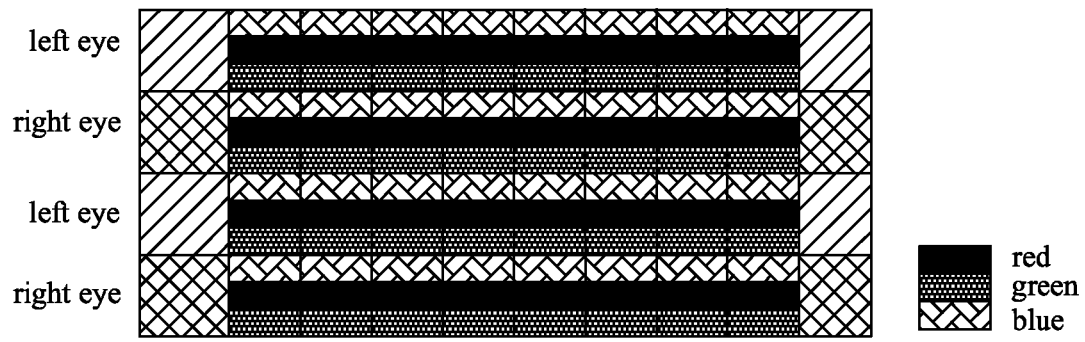
FIG. 1 is a schematic view showing pixel arrangement of a known technique.
Figure 2:
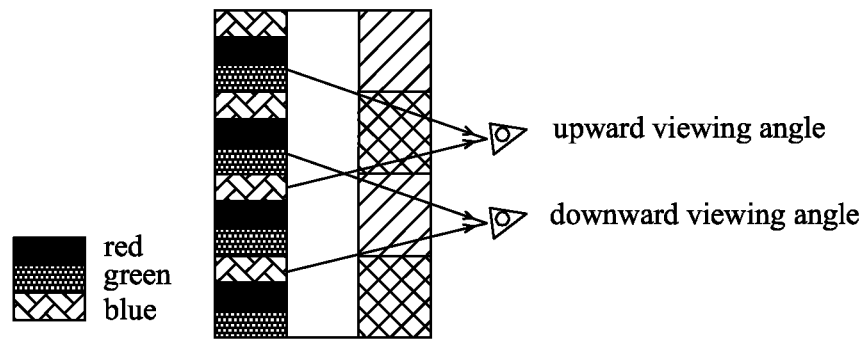
FIG. 2 is a schematic view illustrating human eyes observing the known pixel arrangement.
Figure 3:
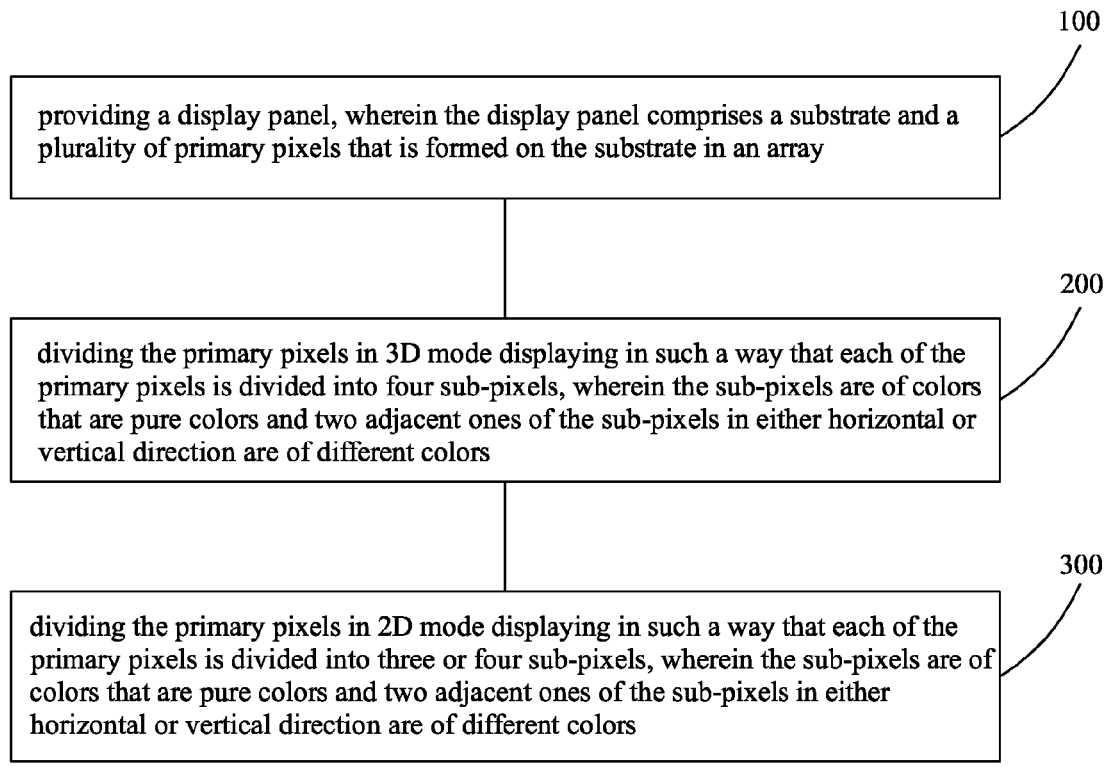
FIG. 3 is a flow chart showing a pixel arrangement method that reduces color shift of pattern retarder glasses based 3D display system in large view angle.
Figure 4:
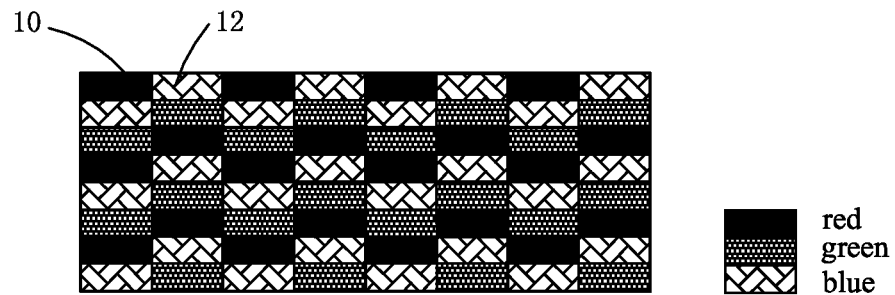
FIG. 4 is a schematic view showing pixel arrangement of display panel in 3D mode according to a preferred embodiment of the present invention.

Specifically, referring to FIG. 4, in performing 3D mode displaying, the primary pixels 10 are divided for the 3D mode displaying in such a way that the primary pixels 10 are each divided into four sub-pixels 12 and the four sub-pixels 12 of each of the primary pixels 10 are arranged in a check pattern. The four sub-pixels 12 are of colors that include red, green, and blue. Each of the primary pixels 10 has at least two of the sub-pixels 12 having the same color. Preferably, the sub-pixels 12 of the primary pixel 10 have colors that are cyclically composed of red, green, and blue in ratios of 2:1:1, 1:2:1, and 1:1:2, but not limited to such ratios. The sub-pixels 12 of the primary pixels 10 can be of the colors that are cyclically composed of red, green, and blue in ratios of 1:2:1, 1:1:2, and 2:1:1 or that are cyclically composed of red, green, and blue in ratios of 1:1:2, 2:1:1, and 1:2:1. Such arrangements eliminate the problem that the interface of the left-eye/right-eye pattern retarders comprises a regular arrangement of pixels of the same color, whereby it does not show a single color, as that occurring in the known techniques, when observed by human eyes at an upward viewing angle or a downward viewing angle. When the present invention is viewed at an upward viewing angle or a downward viewing angle, all the red, blue, and green colors can be observed and this well overcomes the color shift issue occurring at upward viewing angle and downward viewing angle.

Figure 5:
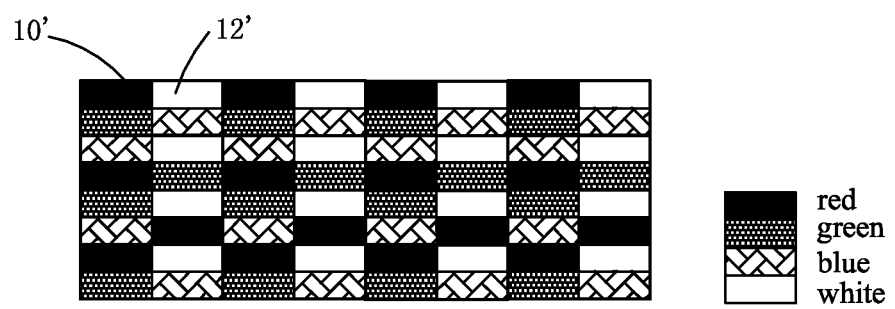
FIG. 5 is a schematic view showing pixel arrangement of display panel in 3D mode according to another preferred embodiment of the present invention.

Referring to FIG. 5, which is a schematic view showing pixel arrangement of display panel in 3D mode according to another preferred embodiment of the present invention, in the instant embodiment, each of the primary pixels 10' is divided into four sub-pixels 12'. The four sub-pixels 12' are respectively of colors that are pure colors and are arranged in a check pattern. The sub-pixels 12' are of colors that include red, blue, green, and white. Two adjacent ones of the sub-pixels 12' in either horizontal or vertical direction are of different colors so as to eliminate the problem that the interface of the left-eye/right-eye pattern retarders comprises a regular arrangement of pixels of the same color, whereby it does not show a single color, as that occurring in the known techniques, when observed by human eyes at an upward viewing angle or a downward viewing angle. When the present invention is viewed at an upward viewing angle or a downward viewing angle, all the red, blue, and green colors can be observed and this well overcomes the color shift issue occurring at upward viewing angle and downward viewing angle.

Step 300: dividing the primary pixels in 2D mode displaying in such a way that each of the primary pixels is divided into three or four sub-pixels, wherein the sub-pixels are of colors that are pure colors and two adjacent ones of the sub-pixels in either horizontal or vertical direction are of different colors.

Figure 6:
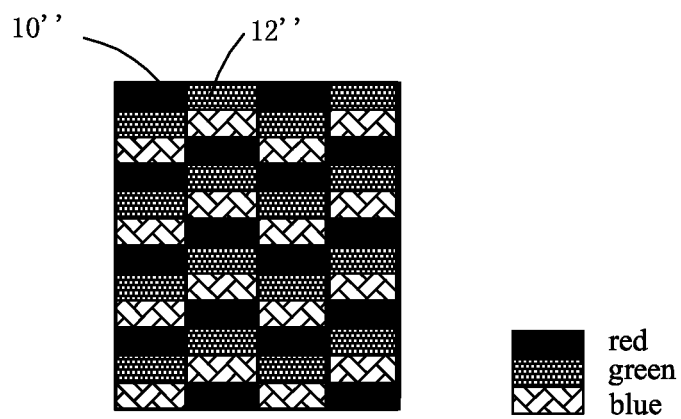
FIG. 6 is a schematic view showing pixel arrangement of display panel in 2D mode according to a preferred embodiment of the present invention.

Specifically, referring to FIG. 6, which is a schematic view showing pixel arrangement of display panel in 2D mode according to a preferred embodiment of the present invention, in the instant embodiment, the primary pixels 10" are divided for the 3D mode displaying in such a way that the primary pixels 10" are each divided into three sub-pixels 12". The three sub-pixels 12" are arranged vertically. The three sub-pixels 12" are of colors that include red, green, and blue and two adjacent ones of the sub-pixels 12" in either horizontal or vertical direction are of different colors. This eliminates the problem that the interface of the left-eye/right-eye pattern retarders comprises a regular arrangement of pixels of the same color, whereby it does not show a single color, as that occurring in the known techniques, when observed by human eyes at an upward viewing angle or a downward viewing angle. When the present invention is viewed at an upward viewing angle or a downward viewing angle, all the red, blue, and green colors can be observed and this well overcomes the color shift issue occurring at upward viewing angle and downward viewing angle.

Figure 7:
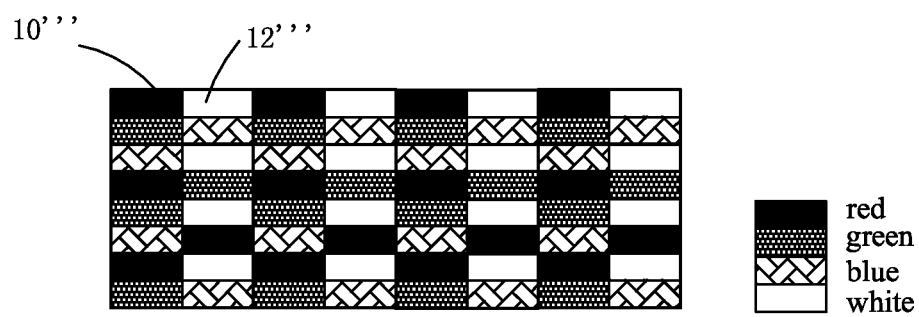
FIG. 7 is a schematic view showing pixel arrangement of display panel in 2D mode according to another preferred embodiment of the present invention.

Referring to FIG. 7, which is a schematic view showing pixel arrangement of display panel in 2D mode according to another preferred embodiment of the present invention, in the instant embodiment, the primary pixels 10''' are each divided into four sub-pixels 12'''. The four sub-pixels 12''' are arranged in a check pattern. The four sub-pixels 12''' are of colors that include red, green, blue, and white and two adjacent ones of the sub-pixels 12''' in either horizontal or vertical direction are of different colors so as to eliminate the problem that the interface of the left-eye/right-eye pattern retarders comprises a regular arrangement of pixels of the same color, whereby it does not show a single color, as that occurring in the known techniques, when observed by human eyes at an upward viewing angle or a downward viewing angle. When the present invention is viewed at an upward viewing angle or a downward viewing angle, all the red, blue, and green colors can be observed and this well overcomes the color shift issue occurring at upward viewing angle and downward viewing angle.

The sequence of Step 200 and Step 300 can be switched with each other.

In the present invention, when the display panel performs 2D mode or 3D mode displaying, each of the primary pixels 10 (10', 10", 10''') is divided into at least three sub-pixels 12 (12', 12", 12''') and the sub-pixels 12 (12', 12", 12''') of each primary pixel 10 (10', 10", 10''') are of colors that include red, blue, and green or red, blue, green, and white and two adjacent ones of the sub-pixels 12 (12', 12", 12''') in either horizontal or vertical direction are of different colors so that when human eyes take observation at upward viewing angle or downward viewing angle, all the red, blue, and green colors can be observed thereby eliminating the potential phenomenon of color shift.

It is noted that the display panel further comprises a driver circuit (not shown) for driving the primary pixels 10 (10', 10", 10'''). The driver circuit comprises a color correction algorithm circuit. The color correction algorithm circuit functions to drive the sub-pixels 12 (12', 12", 12'''), whereby through the control carried out by the circuit, homogeneity of color in both left and right eyes can be regulated for consistency so that human eyes may feel comfortableness in viewing television programs and the tiredness caused by long term watching television can be eliminated.

Each of the sub-pixels 12 (12', 12", 12''') contains liquid crystal molecules (not shown). The driver circuit further comprises a rotation driving circuit. The rotation driving circuit functions to drive rotation of the liquid crystal molecules, whereby through control of the rotation angle of the liquid crystal molecules contained in each sub-pixel 12 (12', 12", 12'''), each sub-pixel is made complying with the desired requirement, such as displaying red, blue, green, or white color, so that light emitting from a backlight module is allowed to transmit through the display panel to show an image.

The present invention also provides a display panel. The display panel includes 2D and 3D displaying modes and comprises: a substrate and a plurality of primary pixels that is formed on the substrate in an array. In 3D mode displaying, each of the primary pixels comprises four sub-pixels. The sub-pixels are of colors that are pure colors and two adjacent ones of the sub-pixels in either horizontal or vertical direction are of different colors. In 2D mode displaying, each of the primary pixels comprises three or four sub-pixels. The sub-pixels are of colors that are pure colors and two adjacent ones of the sub-pixels in either horizontal or vertical direction are of different colors.

Specifically, referring to FIG. 4, which is a schematic view showing pixel arrangement of display panel in 3D mode according to a preferred embodiment of the present invention, in the instant embodiment, each of the primary pixels 10 comprises four sub-pixels 12. The four sub-pixels 12 of each of the primary pixels 10 are arranged in a check pattern. The sub-pixels 12 are of colors that are pure colors and two adjacent ones of the sub-pixels 12 in either horizontal or vertical direction are of different colors. This eliminates the problem that the interface of the left-eye/right-eye pattern retarders comprises a regular arrangement of pixels of the same color so as to well overcome the red-shifting or blue-shifting problem in upward and downward viewing angles occurring in the known techniques.

The four sub-pixels 12 are of colors including red, green, and blue. Each of the primary pixels 10 has at least two of the sub-pixels 12 having the same color. Preferably, the sub-pixels 12 of the primary pixel 10 have colors that are cyclically composed of red, green, and blue in ratios of 2:1:1, 1:2:1, and 1:1:2, but not limited to such ratios. The sub-pixels 12 of the primary pixels 10 can be of the colors that are cyclically composed of red, green, and blue in ratios of 1:2:1, 1:1:2, and 2:1:1 or that are cyclically composed of red, green, and blue in ratios of 1:1:2, 2:1:1, and 1:2:1. Such arrangements eliminate the problem that the interface of the left-eye/right-eye pattern retarders comprises a regular arrangement of pixels of the same color, whereby it does not show a single color, as that occurring in the known techniques, when observed by human eyes at an upward viewing angle or a downward viewing angle. When the present invention is viewed at an upward viewing angle or a downward viewing angle, all the red, blue, and green colors can be observed and this well overcomes the color shift issue occurring at upward viewing angle and downward viewing angle.

Referring to FIG. 5, which is a schematic view showing pixel arrangement of display panel in 3D mode according to another preferred embodiment of the present invention, in the instant embodiment, each of the primary pixels 10' comprises four sub-pixels 12'. The four sub-pixels 12' are respectively of colors that are pure colors and are arranged in a check pattern. The sub-pixels 12' are of colors that include red, blue, green, and white. Two adjacent ones of the sub-pixels 12' in either horizontal or vertical direction are of different colors so as to eliminate the problem that the interface of the left-eye/right-eye pattern retarders comprises a regular arrangement of pixels of the same color, whereby it does not show a single color, as that occurring in the known techniques, when observed by human eyes at an upward viewing angle or a downward viewing angle. When the present invention is viewed at an upward viewing angle or a downward viewing angle, all the red, blue, and green colors can be observed and this well overcomes the color shift issue occurring at upward viewing angle and downward viewing angle.

Referring to FIG. 6, which is a schematic view showing pixel arrangement of display panel in 2D mode according to a preferred embodiment of the present invention, in the instant embodiment, the primary pixels 10'' each comprise three sub-pixels 12''. The three sub-pixels 12'' are arranged vertically. The three sub-pixels 12'' are of colors that include red, green, and blue and two adjacent ones of the sub-pixels 12'' in either horizontal or vertical direction are of different colors. This eliminates the problem that the interface of the left-eye/right-eye pattern retarders comprises a regular arrangement of pixels of the same color, whereby it does not show a single color, as that occurring in the known techniques, when observed by human eyes at an upward viewing angle or a downward viewing angle. When the present invention is viewed at an upward viewing angle or a downward viewing angle, all the red, blue, and green colors can be observed and this well overcomes the color shift issue occurring at upward viewing angle and downward viewing angle.

Referring to FIG. 7, which is a schematic view showing pixel arrangement of display panel in 2D mode according to another preferred embodiment of the present invention, in the instant embodiment, the primary pixels 10''' are each divided into four sub-pixels 12'''. The four sub-pixels 12''' are arranged in a check pattern. The four sub-pixels 12''' are of colors that include red, green, blue, and white and two adjacent ones of the sub-pixels 12''' in either horizontal or vertical direction are of different colors so as to eliminate the problem that the interface of the left-eye/right-eye pattern retarders comprises a regular arrangement of pixels of the same color, whereby it does not show a single color, as that occurring in the known techniques, when observed by human eyes at an upward viewing angle or a downward viewing angle. When the present invention is viewed at an upward viewing angle or a downward viewing angle, all the red, blue, and green colors can be observed and this well overcomes the color shift issue occurring at upward viewing angle and downward viewing angle.

In the present invention, when the display panel performs 2D mode or 3D mode displaying, each of the primary pixels 10 (10', 10'', 10''') is divided into at least three sub-pixels 12 (12', 12'', 12''') and the sub-pixels 12 (12', 12'', 12''') of each primary pixel 10 (10', 10'', 10''') are of colors that include red, blue, and green or red, blue, green, and white and two adjacent ones of the sub-pixels 12 (12', 12'', 12''') in either horizontal or vertical direction are of different colors so that when human eyes take observation at upward viewing angle or downward viewing angle, all the red, blue, and green colors can be observed thereby eliminating the potential phenomenon of color shift.

It is noted that the display panel further comprises a driver circuit (not shown) for driving the primary pixels 10 (10', 10'', 10'''). The driver circuit comprises a color correction algorithm circuit. The color correction algorithm circuit functions to drive the sub-pixels 12 (12', 12'', 12'''), whereby through the control carried out by the circuit, homogeneity of color in both left and right eyes can be regulated for consistency so that human eyes may feel comfortableness in viewing television programs and the tiredness caused by long term watching television can be eliminated.

Each of the sub-pixels 12 (12', 12'', 12''') contains liquid crystal molecules (not shown). The driver circuit further comprises a rotation driving circuit. The rotation driving circuit functions to drive rotation of the liquid crystal molecules, whereby through control of the rotation angle of the liquid crystal molecules contained in each sub-pixel 12 (12', 12'', 12'''), each sub-pixel is made complying with the desired requirement, such as displaying red, blue, green, or white color, so that light emitting from a backlight module is allowed to transmit through the display panel to show an image.

In summary, the present invention provides a pixel arrangement method that reduces color shift of pattern retarder glasses based 3D display system in large view angle, which when applied to arrange the structure of primary pixels in vertical direction in a pattern retarder glasses based 3D display system, in the 3D mode, arranges each of the primary pixels into a combination of four sub-pixels and in the 2D mode, arranges each of the primary pixels into a combination of three or four pixels and two adjacent ones of the sub-pixels in either horizontal or vertical direction are set to be of different colors so as to eliminate the problem that the interface of the left-eye/right-eye pattern retarders comprises a regular arrangement of pixels of the same color and well overcome the color shift problems of the pattern retarder glasses based 3D display system in upward and downward viewing angles. A color correction algorithm circuit is also included to drive the sub-pixels in order to regulate color homogeneity of left and right eyes and interface of left-eye/right-eye pattern retarders thereby improving quality of displaying and enhancing market competition power of product. The present invention also provides a display panel that well overcomes the red/blue color shift issue of the pattern retarder glasses based 3D display system occurring at upward and downward viewing angles to thereby improve the quality of displaying and enhance market competition power of product.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A pixel arrangement method that reduces color shift of pattern retarder glasses based 3D display system in large view angle, comprising the following steps:
    (1) providing a display panel, wherein the display panel comprises a substrate and a plurality of primary pixels that is formed on the substrate in an array having columns and rows, multiple ones of the primary pixels being arranged in each of the columns and multiple ones of the primary pixels being arranged in each of the rows;
    (2) dividing the primary pixels in 3D mode displaying in such a way that each of the primary pixels is divided into four sub-pixels, wherein the sub-pixels are of colors that are pure colors and two adjacent ones of the sub-pixels in either horizontal or vertical direction are of different colors, wherein the sub-pixels of a first one of the primary pixels are arrayed in a first arrangement that is different from a second arrangement in which the sub-pixels of a second one of the primary pixels that is immediately next to the first primary pixel in at least one of a column-wise reaction and a row-wise direction of the primary pixel array are arrayed; wherein the second arrangement of the sub-pixels of the second one of the primary pixels is different from a third arrangement in which the sub-pixels of a third one of the primary pixels that is immediately next to the second primary pixel in the column-wise direction are arrayed and the first, second, and third arrangements that are different from each other are arranged cyclically and consecutively and consecutively in that order in the column-wise direction; and wherein every two immediately adjacent ones of the sub-pixels of the two different arrangements of the first and second primary pixels are different in color; and
    (3) dividing the primary pixels in 2D mode displaying in such a way that each of the primary pixels is divided into three or four sub-pixels, wherein the sub-pixels are of colors that are pure colors and two adjacent ones of the sub-pixels in either horizontal or vertical direction are of different colors, wherein the sub-pixels of a first one of the primary pixels are arrayed in a first arrangement that is different from a second arrangement in which the sub-pixels of a second one of the primary pixels that is immediately next to the first primary pixel in at least one of a column-wise reaction and a row-wise direction of the primary pixel array are arrayed; wherein the second arrangement of the sub-pixels of the second one of the primary pixels is different from a third arrangement in which the sub-pixels of a third one of the primary pixels that is immediately next to the second primary pixel in the column-wise direction are arrayed and the first, second, and third arrangements that are different from each other are arranged cyclically and consecutively in that order in the column-wise direction; and wherein every two immediately adjacent ones of the sub-pixels of the two different arrangements of the first and second primary pixels are different in color.

2. The pixel arrangement method that reduces color shift of pattern retarder glasses based 3D display system in large view angle as claimed in claim 1, wherein the display panel further comprises a driver circuit formed on the substrate, the driver circuit comprising a color correction algorithm circuit, which functions to drive the sub-pixels in order to regulate color homogeneity of left and right eyes.

3. The pixel arrangement method that reduces color shift of pattern retarder glasses based 3D display system in large view angle as claimed in claim 1, wherein in step (2), the four sub-pixels of each of the primary pixels are arranged in a check pattern, the four sub-pixels being of colors that include red, green, and blue, the four sub-pixels of each of the primary pixels being of colors that are cyclically composed of red, green, and blue in ratios of 2:1:1, 1:2:1, and 1:1:2 or the four sub-pixels being of colors that include red, green, blue, and white.

4. The pixel arrangement method that reduces color shift of pattern retarder glasses based 3D display system in large view angle as claimed in claim 1, wherein in step (3), when the primary pixels are each divided into four sub-pixels, the four sub-pixels of each of the primary pixels are arranged in a check pattern, the four sub-pixels being of colors that include red, green, blue, and white.

5. The pixel arrangement method that reduces color shift of pattern retarder glasses based 3D display system in large view angle as claimed in claim 1, wherein in step (3), when the primary pixels are each divided into three sub-pixels, the three sub-pixels are arranged vertically, the three sub-pixels being of colors that include red, green, and blue.

6. A pixel arrangement method that reduces color shift of pattern retarder glasses based 3D display system in large view angle, comprising the following steps:
    (1) providing a display panel, wherein the display panel comprises a substrate and a plurality of primary pixels that is formed on the substrate in an array;
    (2) dividing the primary pixels in 3D mode displaying in such a way that each of the primary pixels is divided into four sub-pixels, wherein the sub-pixels are of colors that are pure colors and two adjacent ones of the sub-pixels in either horizontal or vertical direction are of different colors, wherein the sub-pixels of a first one of the primary pixels are arrayed in a first arrangement that is different from a second arrangement in which the sub-pixels of a second one of the primary pixels that is immediately next to the first primary pixel in at least one of a column-wise reaction and a row-wise direction of the primary pixel array are arrayed; wherein the second arrangement of the sub-pixels of the second one of the primary pixels is different from a third arrangement in which the sub-pixels of a third one of the primary pixels that is immediately next to the second primary pixel in the column-wise direction are arrayed and the first, second, and third arrangements that are different from each other are arranged cyclically and consecutively in that order in the column-wise direction; and wherein every two immediately adjacent ones of the sub-pixels of the two different arrangements of the first and second primary pixels are different in color; and
    (3) dividing the primary pixels in 2D mode displaying in such a way that each of the primary pixels is divided into three or four sub-pixels, wherein the sub-pixels are of colors that are pure colors and two adjacent ones of the sub-pixels in either horizontal or vertical direction are of different colors, wherein the sub-pixels of a first one of the primary pixels are arrayed in a first arrangement that is different from a second arrangement in which the sub-pixels of a second one of the primary pixels that is immediately next to the first primary pixel in at least one of a column-wise reaction and a row-wise direction of the primary pixel array are arrayed; wherein the second arrangement of the sub-pixels of the second one of the primary pixels is different from a third arrangement in which the sub-pixels of a third one of the primary pixels that is immediately next to the second primary pixel in the column-wise direction are arrayed and the first, second, and third arrangements that are different from each other are arranged cyclically and consecutively in that order in the column-wise direction; and wherein every two immediately adjacent ones of the sub-pixels of the two different arrangements of the first and second primary pixels are different in color;

wherein the display panel further comprises a driver circuit formed on the substrate, the driver circuit comprising a color correction algorithm circuit, which functions to drive the sub-pixels in order to regulate color homogeneity of left and right eyes;

wherein in step (2), the four sub-pixels of each of the primary pixels are arranged in a check pattern, the four sub-pixels being of colors that include red, green, and blue, the four sub-pixels of each of the primary pixels being of colors that are cyclically composed of red, green, and blue in ratios of 2:1:1, 1:2:1, and 1:1:2 or the four sub-pixels being of colors that include red, green, blue, and white; and wherein in step (3), when the primary pixels are each divided into four sub-pixels, the four sub-pixels of each of the primary pixels are arranged in a check pattern, the four sub-pixels being of colors that include red, green, blue, and white.

7. A display panel, the display panel including 2D and 3D displaying modes and comprising: a substrate and a plurality of primary pixels that is formed on the substrate in an array, wherein in 3D mode displaying, each of the primary pixels comprises four sub-pixels, the sub-pixels being of colors that are pure colors, two adjacent ones of the sub-pixels in either horizontal or vertical direction being of different colors, wherein the sub-pixels of a first one of the primary pixels are arrayed in a first arrangement that is different from a second arrangement in which the sub-pixels of a second one of the primary pixels that is immediately next to the first primary pixel in at least one of a column-wise reaction and a row-wise direction of the primary pixel array are arrayed; wherein the second arrangement of the sub-pixels of the second one of the primary pixels is different from a third arrangement in which the sub-pixels of a third one of the primary pixels that is immediately next to the second primary pixel in the column-wise direction are arrayed and the first, second, and third arrangements that are different from each other are arranged cyclically and consecutively and consecutively in that order in the column-wise direction; and wherein every two immediately adjacent ones of the sub-pixels of the two different arrangements of the first and second primary pixels are different in color, and in 2D mode displaying, each of the primary pixels comprises three or four sub-pixels, the sub-pixels being of colors that are pure colors, two adjacent ones of the sub-pixels in either horizontal or vertical direction being of different colors, wherein the sub-pixels of a first one of the primary pixels are arrayed in a first arrangement that is different from a second arrangement in which the sub-pixels of a second one of the primary pixels that is immediately next to the first primary pixel in at least one of a column-wise reaction and a row-wise direction of the primary pixel array are arrayed; wherein the second arrangement of the sub-pixels of the second one of the primary pixels is different from a third arrangement in which the sub-pixels of a third one of the primary pixels that is immediately next to the second primary pixel in the column-wise direction are arrayed and the first, second, and third arrangements that are different from each other are arranged cyclically and consecutively and consecutively in that order in the column-wise direction; and wherein every two immediately adjacent ones of the sub-pixels of the two different arrangements of the first and second primary pixels are different in color.

8. The display panel as claimed in claim 7 further comprising a driver circuit formed on the substrate, the driver circuit comprising a color correction algorithm circuit, which functions to drive the sub-pixels in order to regulate color homogeneity of left and right eyes.

9. The display panel as claimed in claim 7, wherein in 3D mode displaying, the four sub-pixels are arranged in a check pattern, the four sub-pixels being of colors that include red, green, and blue, the four sub-pixels of each of the primary pixels being of colors that are cyclically composed of red, green, and blue in ratios of 2:1:1, 1:2:1, and 1:1:2 or the four sub-pixels being of colors that include red, green, blue, and white.

10. The display panel as claimed in claim 7, wherein in 2D mode displaying, when each of the primary pixels comprises four sub-pixels, the four sub-pixels are arranged in a check pattern, the four sub-pixels being of colors that include red, green, blue, and white.

11. The display panel as claimed in claim 7, wherein in 2D mode displaying, when each of the primary pixels comprises three sub-pixels, the three sub-pixels are arranged vertically, the three sub-pixels being of colors that include red, green, and blue.

* * * * *